(12) United States Patent
Pileri et al.

(10) Patent No.: US 7,432,489 B2
(45) Date of Patent: Oct. 7, 2008

(54) SYSTEM AND METHOD FOR ERRANT LASER BEAM DETECTION USING A CONTINUITY CIRCUIT ADJACENT AN OPTIC

(75) Inventors: David Pileri, Newbury Park, CA (US); Harry C. Boretz, Agoura Hills, CA (US); Yan S. Tam, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/140,890

(22) Filed: May 31, 2005

(65) Prior Publication Data

US 2006/0266920 A1 Nov. 30, 2006

(51) Int. Cl.
*G01J 1/32* (2006.01)
*H01L 31/00* (2006.01)

(52) U.S. Cl. .................................... 250/205; 250/214.1

(58) Field of Classification Search ................. 250/205, 250/214 R, 214.1
See application file for complete search history.

(56) References Cited

U.S. PATENT DOCUMENTS

| 4,578,670 | A | * | 3/1986 | Joergensen | 340/550 |
| 5,151,095 | A | * | 9/1992 | Teeple, Jr. | 606/2 |
| 6,518,586 | B1 | * | 2/2003 | Heberer | 250/515.1 |

* cited by examiner

*Primary Examiner*—Que T. Le
*Assistant Examiner*—Pascal M Bui-Pho
(74) *Attorney, Agent, or Firm*—MacPherson Kwok Chen & Heid, LLP.; David S. Park

(57) ABSTRACT

A system and method for errant laser beam detection are provided for effectively detecting small coating failures in a cost effective and robust manner. In one embodiment, a detection system includes a continuity circuit on a printed circuit board (PCB) having metal (e.g., copper) traces which are designed to burn through if an errant beam strikes them. The traces are sized and patterned appropriately to sense a minimum subaperture size.

20 Claims, 5 Drawing Sheets

SYSTEM AND METHOD FOR ERRANT LASER BEAM DETECTION USING A CONTINUITY CIRCUIT ADJACENT AN OPTIC

STATEMENT REGARDING FEDERALLY SPONSORED RESEARCH OR DEVELOPMENT

This invention was made with Government support under contract number USZA22-02-C-0049 awarded by the U.S. Special Operations Command. The Government has certain rights in this invention.

TECHNICAL FIELD

The present invention relates generally to errant laser beam detection and, more particularly, to an errant laser beam sensing system and method used with optics.

BACKGROUND

Errant laser beam safety sensors are required on most high power lasers (e.g., the airborne laser (ABL) and the Advanced Tactical Laser (ATL) Advanced Component Technology Demonstration (ACTD)) to mitigate catastrophic events. Errant beam failures can be caused by pointing errors from actuated or drifted optics, or by failure of reflective optical coatings, or by substrate fracture, which allows the errant beam to travel through the optical substrate. Optical coating failure can cause extensive absorption by the optical substrate causing substrate failure, or the light can transmit through and out the back of the substrate causing serious safety issues. Failure conditions on optical coatings and optical substrates are particularly difficult to detect because coatings can fail in small subapertures (i.e., an area less than the aperture area of the optic in question).

Currently, high energy laser (HEL) abort systems are included in a laser design to quickly deactivate lasing, usually through the use of a high speed shutter that closes once failure conditions are sensed. Previously, detection systems have included optical scattering sensors and burn wires but such detection systems have been expensive to calibrate and implement, and have lacked the capability to effectively detect subaperture coating failures.

Accordingly, a system and method for accurately and effectively detecting errant laser beams are highly desirable, especially errant beams caused by subaperture optical coating failure.

SUMMARY

The present invention provides a novel approach to detecting errant laser beams that effectively senses small subaperture coating failures in a cost effective and robust manner.

In accordance with an embodiment of the present invention, an errant laser beam detection system is provided, the system including a continuity circuit adjacent a surface for receiving a beam from a laser and including at least one metal trace pattern, and a laser abort system operably coupled to the continuity circuit, the laser abort system configured to deactivate the laser when the continuity circuit is broken.

In accordance with another embodiment of the present invention, an errant laser beam detection system is provided, the system including an optic for receiving a beam from a laser, and a fuse assembly adjacent the optic and including a continuity circuit on a printed circuit board (PCB), the continuity circuit including a first metal trace pattern on a first side of the PCB and a second metal trace pattern on a second side of the PCB. The system further includes an absorber plate assembly adjacent the fuse assembly, and a laser abort system operably coupled to the continuity circuit, the laser abort system configured to deactivate the laser when the continuity circuit is broken.

In accordance with yet another embodiment of the present invention, a method for detecting an errant laser beam is provided, the method including providing an optic for receiving a beam from a laser, providing a continuity circuit adjacent the optic and including at least one metal trace pattern, and providing a laser abort system operably coupled to the continuity circuit. The method further includes breaking the continuity circuit with a beam that passes through the optic, and deactivating the laser.

Advantageously, the present invention is capable of sensing various sizes and numbers of subaperture coating and/or substrate failures on high energy optics. The fuse design is flexible and may be tailored to suit a range of aperture sizes and intensities. The present invention is also inexpensive to manufacture and implement while at the same time being a robust system, thereby reducing the cost of safety implementation while increasing reliability.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1A:
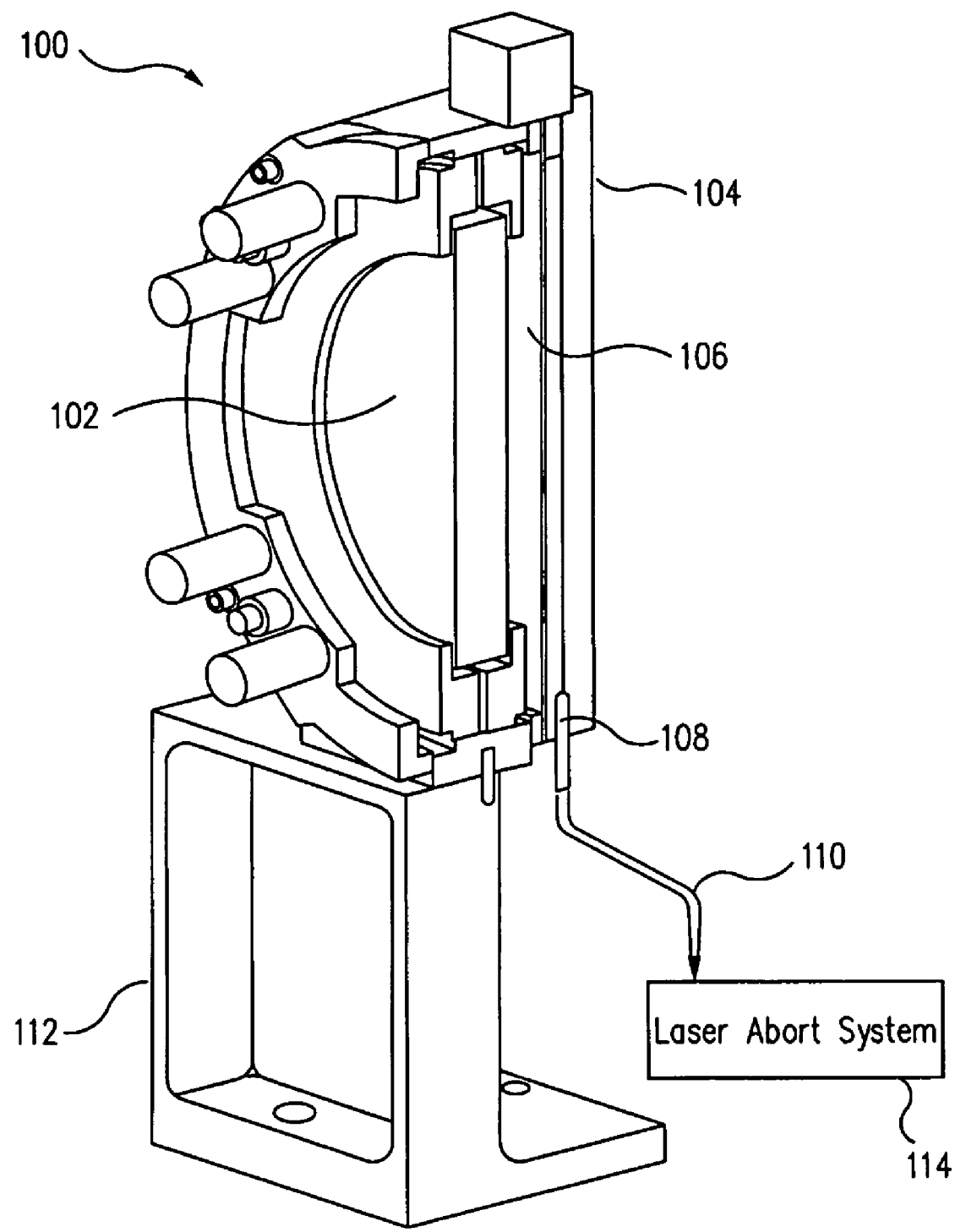
FIG. 1A shows a perspective view of an errant laser beam detection system in accordance with an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

The present invention provides a system and method for errant laser beam detection that effectively senses small (e.g., subaperture) coating failures in a cost effective and robust manner. In one embodiment, a detection system includes a continuity circuit on a printed circuit board (PCB) having metal (e.g., copper) traces which are designed to burn through if an errant beam strikes them. The traces are sized and patterned appropriately to sense a minimum subaperture size, in one example being about 0.005 inch by 0.005 inch square.

In another embodiment of the present invention, the detection system includes an absorber plate adjacent the continuity circuit to safely absorb energy that may pass through the continuity circuit, especially a laser beam below a minimum subaperture size. The combination of the continuity circuit and the absorber plate effectively and robustly mitigates various sizes and quantities of potential coating and/or substrate failures. In one example, the present invention may be used in conjunction with high energy lasers such as the ABL and ATL.

It is noted that when an element such as an assembly, film, or substrate is referred to in this document as being "on" or "adjacent" another element, it can be directly on the other element or intervening elements may also be present.

Figure 1B:
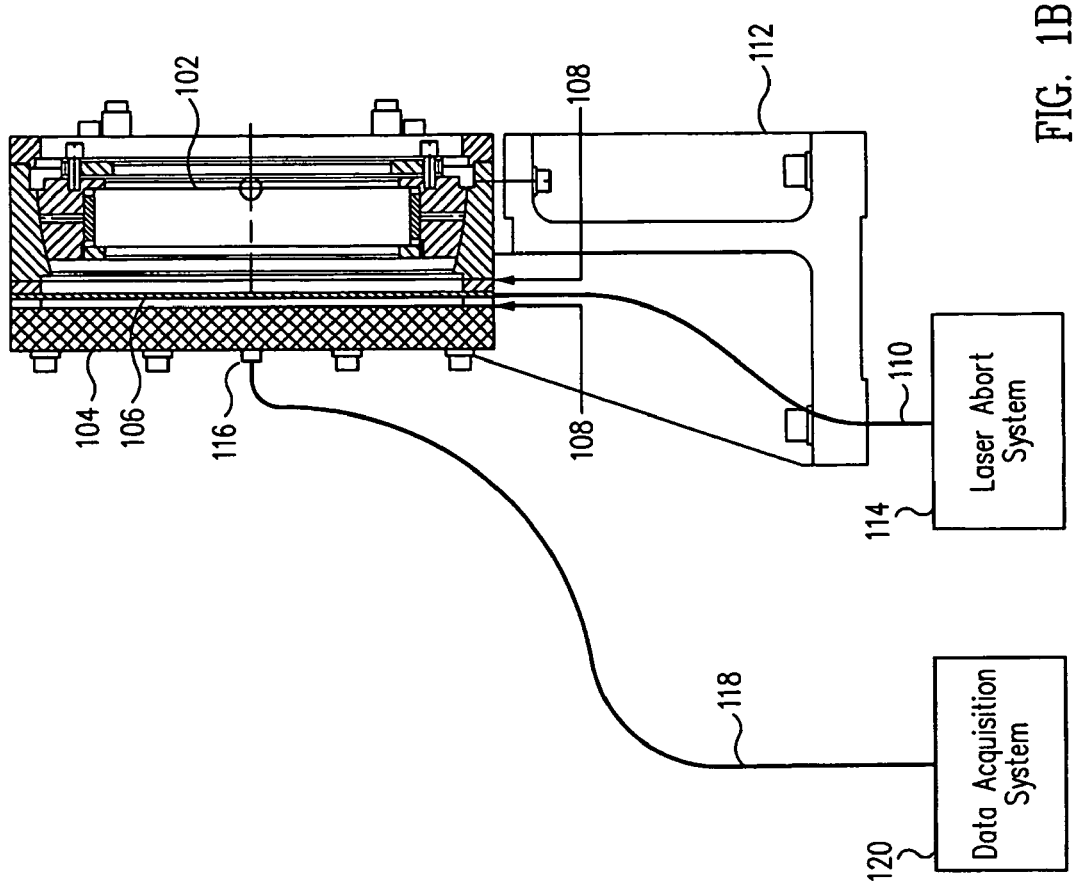
FIG. 1B shows a sectional view of the errant laser beam detection system of FIG. 1A in accordance with an embodiment of the present invention.
Figure 1C:
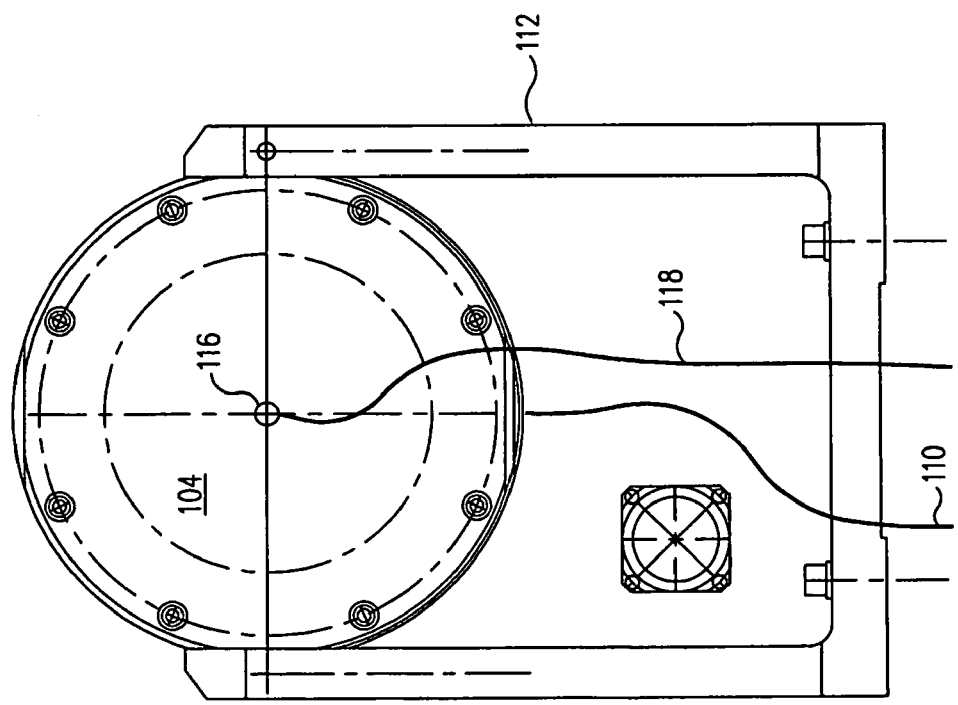
FIG. 1C shows a rear view of the errant laser beam detection system of FIG. 1A in accordance with an embodiment of the present invention.

Referring now to FIGS. 1A, 1B, and 1C, a perspective view, a cross-sectional view, and a rear view, respectively, are shown of an errant laser beam detection system 100 in accordance with an embodiment of the present invention. System 100 includes a fuse assembly 106 and an absorber plate assembly 104 in one embodiment but the invention does not require both assemblies. Fuse assembly 106 may be isolated from absorber plate assembly 104 by insulator rings 108. Fuse assembly 106 and absorber plate assembly 104 are operably configured with an optic 102 housed by a housing 112. Fuse assembly 106 is adjacent optic 102 on the side of optic 102 which does not directly receive a laser beam. A laser abort system 114 is operably coupled to fuse assembly 106 via lead wires 110. Laser abort system 114 may also be operably coupled to absorber plate assembly 104.

Figure 2A:
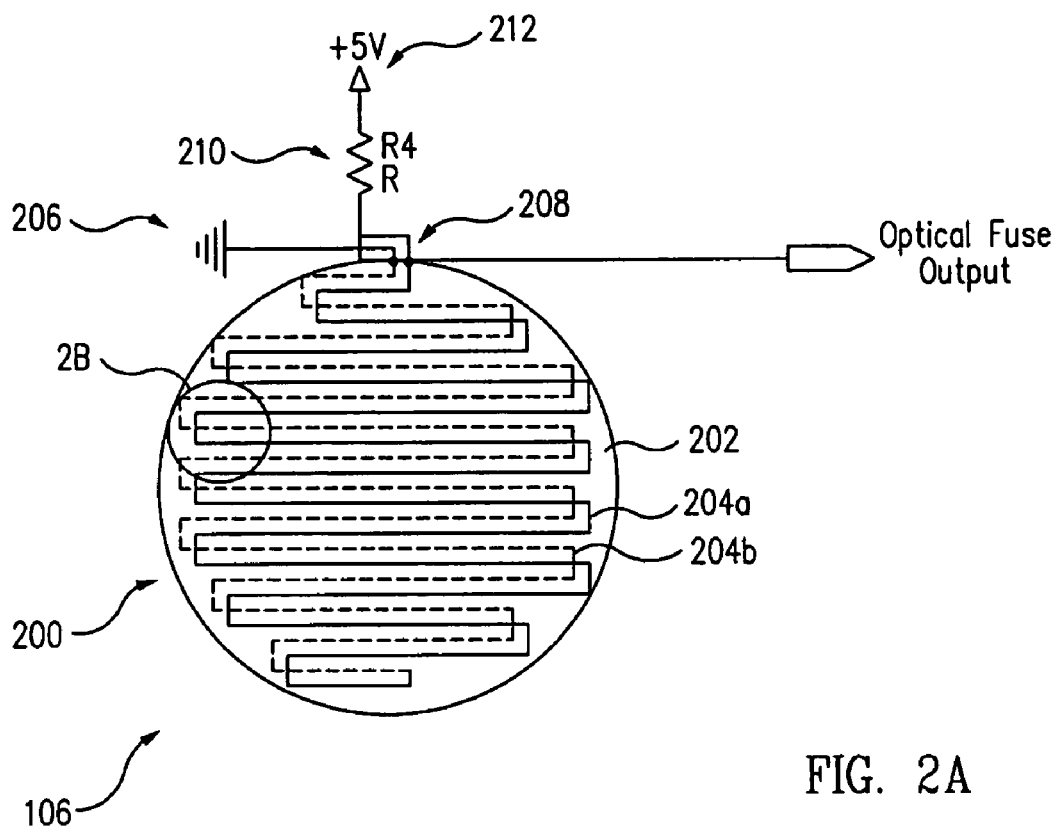
FIG. 2A shows a diagram illustrating a fuse assembly including a continuity circuit on a printed circuit board in accordance with an embodiment of the present invention.
Figure 2B:
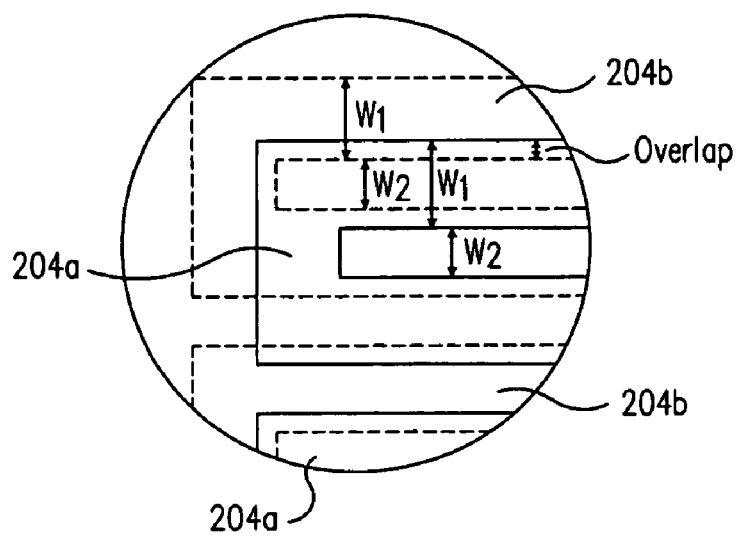
FIG. 2B shows an enlarged view of a section of the continuity circuit in accordance with an embodiment of the present invention.

Referring now to FIGS. 2A and 2B in conjunction with FIGS. 1A-1C, fuse assembly 106 includes, in one embodiment, a continuity circuit 200 formed on a printed circuit board (PCB) 202 sized to substantially cover the entire optical aperture of optic 102 in question. The continuity circuit is a closed circuit and includes metal traces 204a (shown by solid lines) provided on one side of PCB 202 in a metal trace pattern, in one example forming a raster scan or serpentine pattern. In one embodiment, metal traces 204a may be patterned to substantially cover the entire aperture area of optic 102 leaving a negligible spacing $W_2$ (FIG. 2B) between the metal traces. The optical fuse may be implemented behind any particular optical area that needs errant beam sensing. One end of the metal trace pattern (i.e., the continuity circuit) is connected to a ground 206 and the other end of the metal trace pattern is connected to a pull-up resistor 210 across which a voltage 212 is applied. The output of the continuity circuit is provided at a node 208, which is electrically coupled to laser abort system 114. In one embodiment, resistor 210 may be located remotely from the metal trace, for example within laser abort system 114.

In accordance with another embodiment of the present invention, PCB 202 is covered on both sides with metal traces. In one example, metal traces 204a (shown by solid lines) are provided on one side of PCB 202 and metal traces 204b (shown by dashed lines) are provided on the other side of PCB 202. Both metal traces 204a and 204b form a metal trace pattern, in this example both metal traces forming a raster scan or serpentine metal trace pattern.

Referring in particular to FIG. 2B, the metal traces may be offset from each other to overlap one another or interweave one another. In one embodiment, the metal traces may be offset by a metal trace width $W_1$ to provide substantially 100% coverage of the aperture of optic 102 when the metal traces are patterned to be apart by a spacing $W_2$ that is smaller than metal trace width $W_1$. A width $W_1$ of metal traces 204a and 204b may be designed to suit the desired burn through time and/or the desired size of subaperture failure protection depending on the requirements of the particular laser system. In one example, width $W_1$ is about 0.005 inch with a 0.003 inch spacing $W_2$ between traces, yielding an overlap of about 0.001 inch. It is noted that the metal traces may be offset in various directions including but not limited to vertical and horizontal shifts relative to one another. The metal traces may be formed of copper but various applicable metals may be used in accordance with the present invention. The two metal traces 204a and 204b are wired in series as part of a continuity circuit.

If a laser beam penetrates through optic 102 and melts away a portion of a metal trace (on either side of the PCB), thereby breaking the continuity circuit and causing an open circuit, resistor 210 pulls up to a logic level high from a low or ground state, and thereby provides an output signal to invoke laser abort system 114 to deactivate the laser (not shown). Advantageously, a user may be provided with an approximate location of the optic failure by corresponding the burn through location of the metal trace to a location on the optic. A user may also be provided with an identity of the failed optic by corresponding to the identified open circuit.

Referring again to FIGS. 1A, 1B, and 1C, errant laser beam detection system 100 further includes absorber plate assembly 104 in one embodiment. Errant laser energy smaller than the circuit pattern width or errant laser energy at any size that penetrated the optics and before deactivation of the laser beam is mitigated by either absorption by PCB 202 (FIG. 2A) or by absorber plate assembly 104 behind PCB 202 (FIG. 2A). Absorber plate assembly 104 may be comprised of copper or other applicable metal or material that allows for absorption or capturing of a laser beam that penetrates through fuse assembly 106. In yet another embodiment, absorber plate assembly 104 may include a temperature sensing device 116, which is operably coupled to a data acquisition system 120 via cable 118, either for data acquisition and storage that could indicate a developing failure or to invoke laser abort system 114 if a threshold temperature is exceeded. Advantageously, absorber plate assembly 104 provides a redundant safety mechanism and also provides a time gap for laser abort system 114 to deactivate the laser. In other words, absorber plate assembly 104 mitigates the errant laser energy that penetrates an optic and allows for deactivation of the laser beam even when the response time of the laser abort system is up to about 0.25 seconds, in one example the response time including trace melt through, sensor acknowledgement, central control processing, command signal travel, shutter response, and laser resonator response.

Laser abort system 114 is operably coupled to fuse assembly 106 and/or absorber plate assembly 104 and deactivates a laser beam transmitted to optic 102. Laser abort system 114 may activate a shutter in a resonator or use any applicable method or apparatus to appropriately deactivate a laser or deflect a laser beam from impinging on the optic in which failure has been sensed. Any applicable laser may be deactivated, including but not limited to a solid state laser and a chemical laser.

Optic 102, in one example, may be a high power optic which may be used in the ATL and ABL systems (e.g., a reflective, transmissive, polarizing, or beam-splitting substrate such as a mirror, lens, or prism), but optic 102 is not so limited and may include various kinds and types of applicable optics for receiving a laser beam (e.g., a reflective, transmissive, polarizing, or beam-splitting substrate such as a mirror, lens, or prism). Optic 102 may further have various aperture sizes and coatings.

Housing 112 operably holds optic 102 in an optical mount application in the embodiment illustrated in FIGS. 1 and 2, but housing 112 is not so limited and may include any operable holder, cassette, or other housing for an optic.

Figure 3:
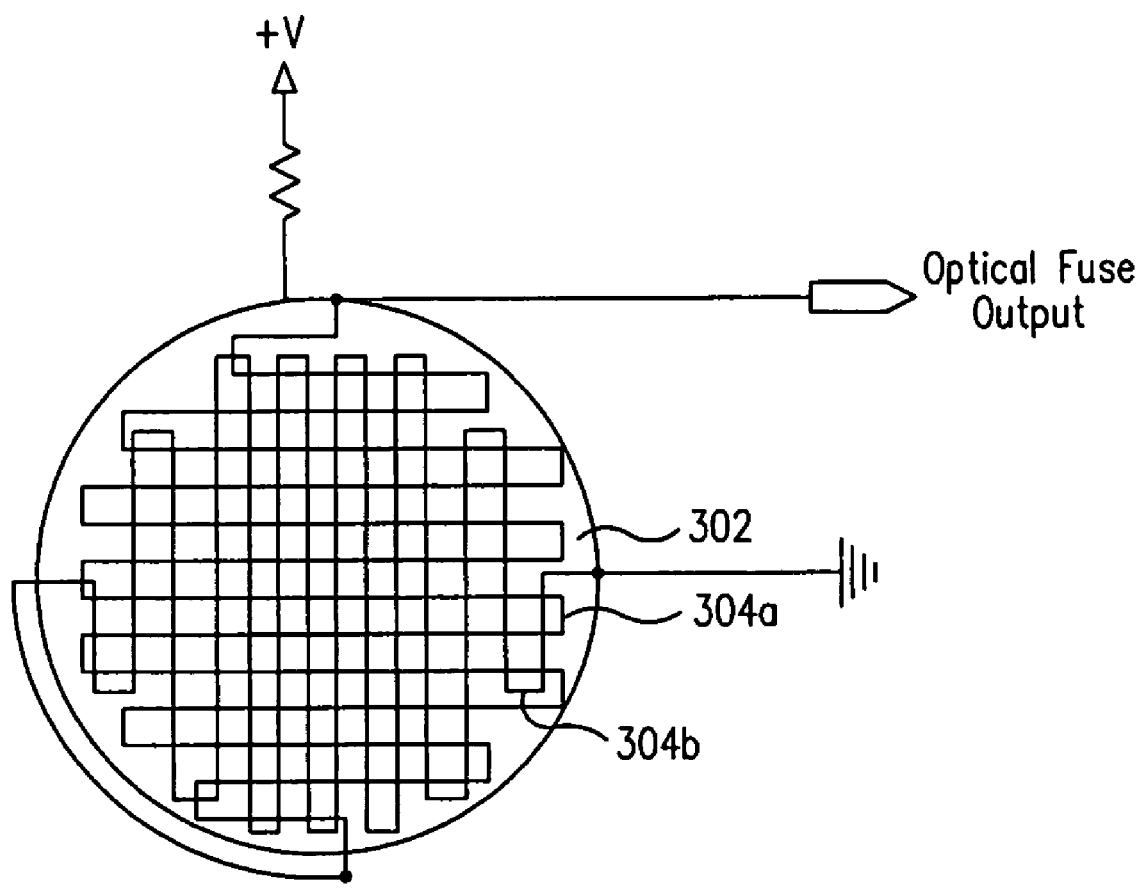
FIGS. 3, 4, and 5 show alternative metal trace patterns of the continuity circuit in accordance with other embodiments of the present invention.
Figure 4:
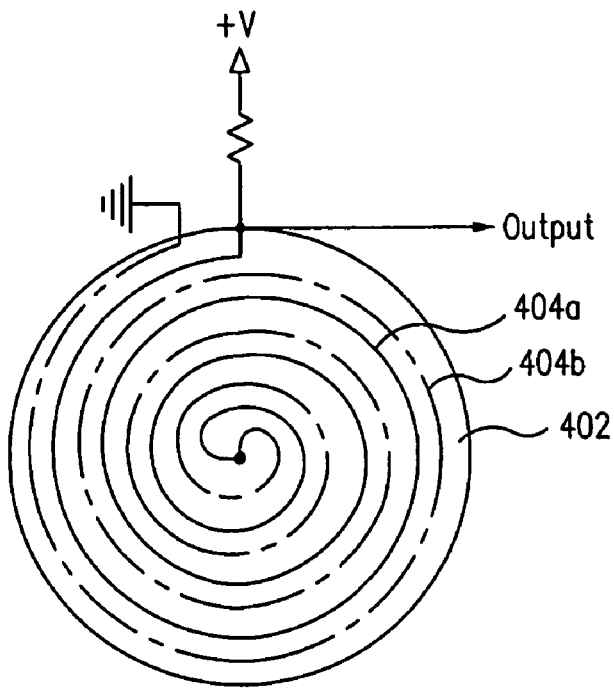
Figure 5:
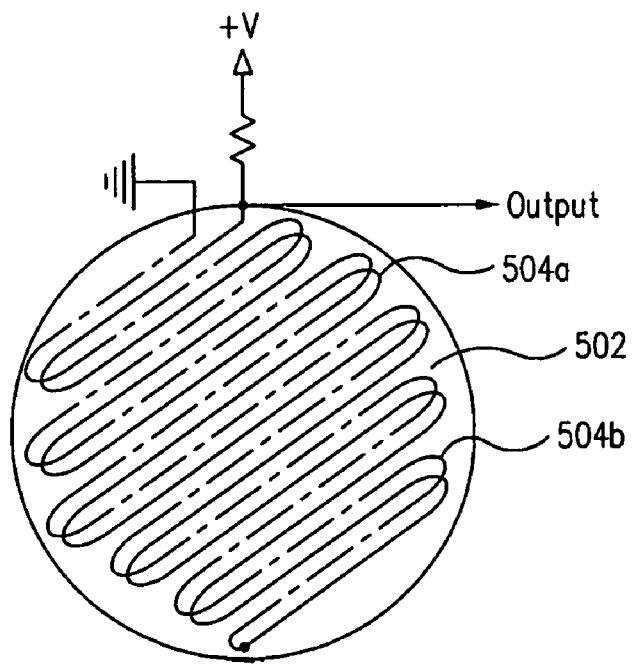

Referring now to FIGS. 3, 4, and 5, alternative metal trace patterns are shown on a PCB but are otherwise similar to continuity circuit 200 described above with respect to FIGS. 2A and 2B. FIG. 3 shows a criss-cross pattern of metal traces 304a and 304b on a PCB 302, FIG. 4 shows a concentric metal trace pattern of metal traces 404a and 404b on a PCB 402, and FIG. 5 shows a diagonal metal trace pattern of metal traces 504a and 504b on a PCB 502. Metal traces 304a, 404a, and 504a are provided on one side of the PCB and metal traces 304b, 404b, and 504b are provided on the other side of the PCB. It should be noted that the PCB is not limited to a circular shape but may be of various shapes suitable to substantially cover an aperture area of interest.

Advantageously, the present invention is capable of sensing various sizes and numbers of subaperture coating and/or substrate failures on high energy optics. The fuse design is flexible and may be tailored to suit a range of aperture sizes and intensities. The present invention is also inexpensive to manufacture and implement while at the same time being a robust system, thereby reducing the cost of safety implementation while increasing reliability.

Embodiments described above illustrate but do not limit the invention. It should also be understood that numerous modifications and variations are possible in accordance with the principles of the present invention. Accordingly, the scope of the invention is defined only by the following claims.

We claim:

1. An errant laser beam detection system, comprising:
   a continuity circuit adjacent an optic having an optical aperture that receives a beam from a laser, the continuity circuit including at least one metal trace pattern; and
   a laser abort system operably coupled to the continuity circuit, the laser abort system configured to deactivate the laser when a beam that passes through the optical aperture impinges upon the continuity circuit.

2. The system of claim 1, wherein the continuity circuit is on a printed circuit board covering substantially the entire area of the optical aperture for receiving a beam from a laser.

3. The system of claim 2, wherein the continuity circuit includes a first metal trace pattern on a first side of the printed circuit board and a second metal trace pattern on a second side of the printed circuit board.

4. The system of claim 3, wherein the first and second metal trace patterns are connected in series.

5. The system of claim 3, wherein the first and second metal trace patterns are offset from one another by a metal trace width to cover substantially the entire area of the optical aperture.

6. The system of claim 1, wherein the at least one metal trace pattern is selected from the group consisting of a raster scan pattern, a diagonal pattern, and a concentric pattern.

7. The system of claim 1, wherein the at least one metal trace pattern covers substantially the entire area of the optical aperture.

8. The system of claim 1, wherein the at least one metal trace pattern includes a metal trace having a width at least about 0.005 inch.

9. The system of claim 1, further comprising an absorber plate assembly adjacent the continuity circuit.

10. The system of claim 9, wherein the absorber plate assembly includes a temperature sensing device operably coupled to the laser abort system or a data collection system.

11. An errant laser beam detection system, comprising:
    a high power optic having an optical aperture that receives a beam from a laser;
    a fuse assembly adjacent the optic and including a continuity circuit on a printed circuit board (PCB), the continuity circuit including a first metal trace pattern on a first side of the PCB and a second metal trace pattern on a second side of the PCB;
    an absorber plate assembly adjacent the fuse assembly; and
    a laser abort system operably coupled to the continuity circuit, the laser abort system configured to deactivate the laser when an errant beam that passes through the optical aperture impinges upon the continuity circuit.

12. The system of claim 11, wherein the first and second metal trace patterns are connected in series.

13. The system of claim 11, wherein the first and second metal trace patterns are offset from one another by a metal trace width to cover substantially the entire area of the optical aperture.

14. The system of claim 11, wherein the first and second metal trace patterns each includes a metal trace having a width at least about 0.005 inch.

15. The system of claim 11, wherein the absorber plate assembly includes a temperature sensing device operably coupled to the laser abort system.

16. A method for detecting an errant laser beam, the method comprising:
    providing an optic having an optical aperture that receives a beam from a laser;
    providing a continuity circuit adjacent the optic and including at least one metal trace pattern;
    providing a laser abort system operably coupled to the continuity circuit;
    breaking the continuity circuit with a beam that passes through the optical aperture; and
    deactivating the laser.

17. The method of claim 16, wherein the continuity circuit is provided on a printed circuit board (PCB), the continuity circuit including a first metal trace pattern on a first side of the PCB and a second metal trace pattern on a second side of the PCB.

18. The method of claim 17, further comprising offsetting the first and second metal trace patterns from one another by a metal trace width to cover substantially the entire area of the optical aperture.

19. The method of claim 16, further comprising capturing a laser beam that passes through the continuity circuit via an absorber plate assembly.

20. The method of claim 16, further comprising covering substantially the entire area of the optical aperture with the at least one metal trace pattern.

* * * * *